Feb. 21, 1956  G. E. METCALF, JR  2,735,485
CASING CUTTING TOOL
Filed May 21, 1954  3 Sheets-Sheet 1
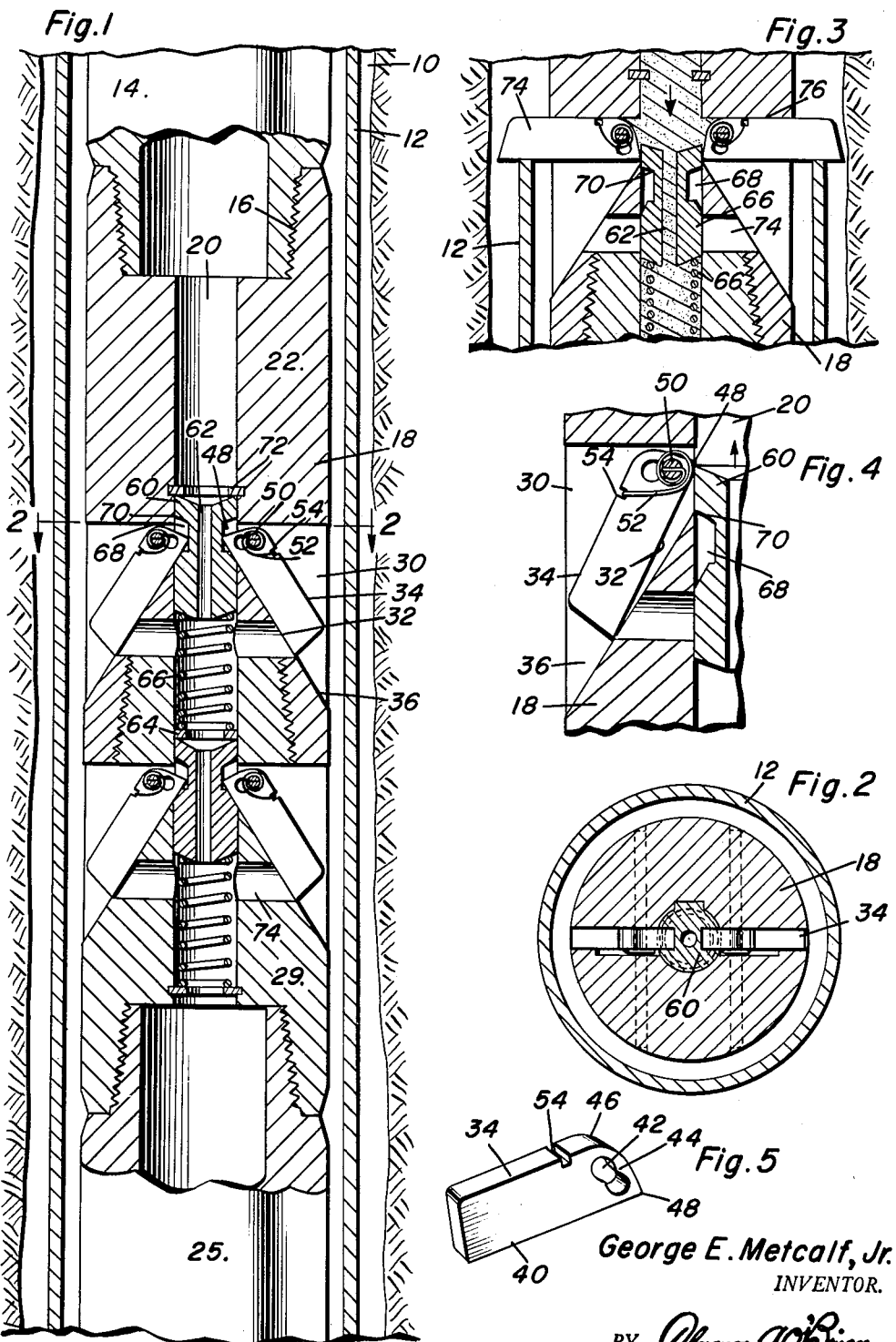
George E. Metcalf, Jr.
INVENTOR.

Feb. 21, 1956

G. E. METCALF, JR 2,735,485

CASING CUTTING TOOL

Filed May 21, 1954

George E. Metcalf, Jr.
INVENTOR.

BY Clarence A. O'Brien
and Harvey B. Jacobson
Attorneys

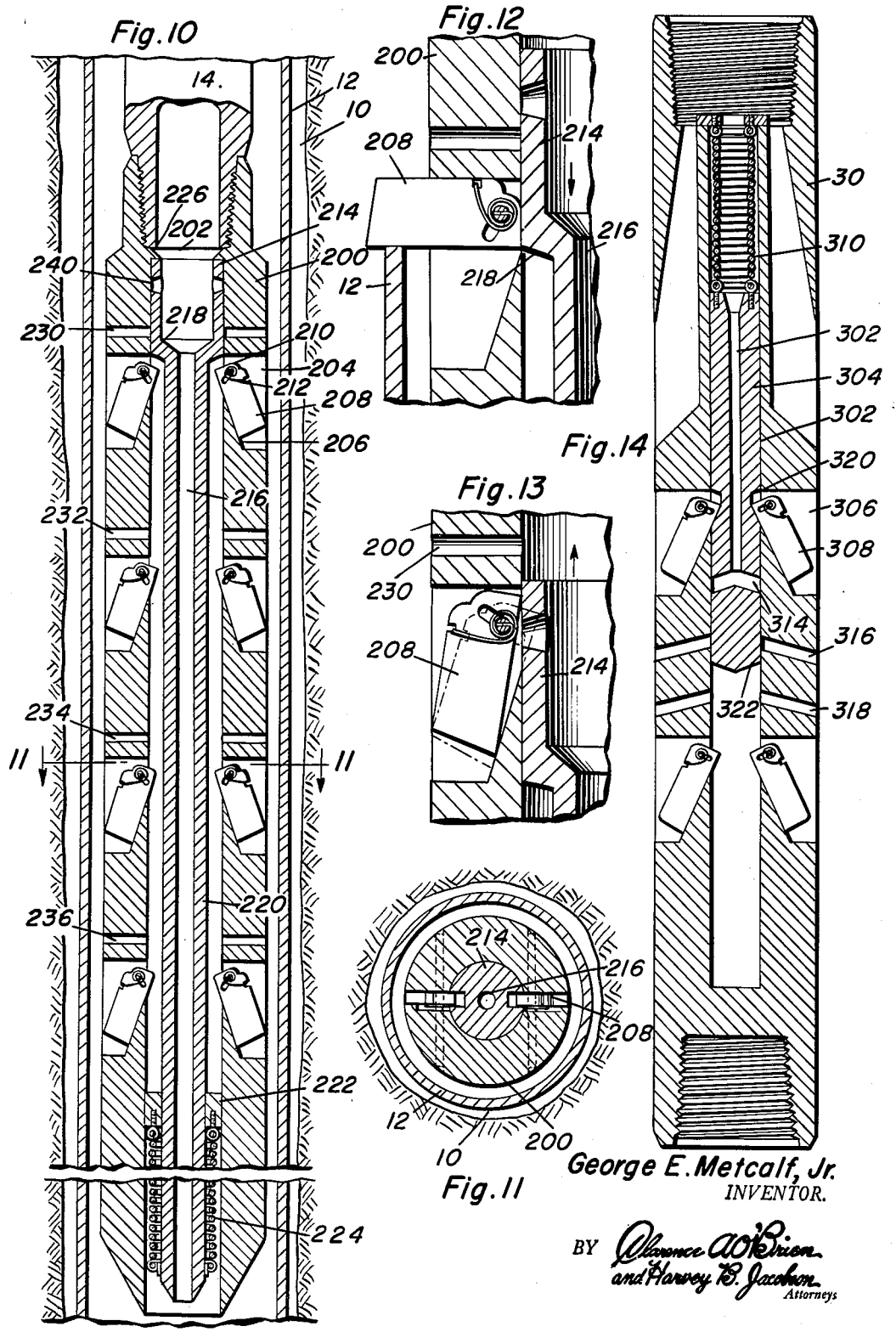

United States Patent Office 2,735,485
Patented Feb. 21, 1956

2,735,485

CASING CUTTING TOOL

George E. Metcalf, Jr., Denver, Colo.

Application May 21, 1954, Serial No. 431,416

9 Claims. (Cl. 164—.8)

This invention relates to a casing cutting tool and particularly to a cutting tool having a plurality of groups of cutters and means for successively projecting the cutters into operating position.

In the drilling of oil wells, it frequently happens that for some reason or other it is desirable to discontinue the well bore being constructed and to construct another bore which extends slightly at an angle to the original bore so as to continue the bore into adjacent territory.

Heretofore, this has been accomplished by cutting a so-called window in the casing in the well, and this is accomplished by providing a cutting tool which will be rotated to cut off the casing and then cut down the casing until sufficient space has been provided so that a suitable guide member may be positioned in the bottom casing and the new bore started at a slight angle to the original bore.

Frequently, in this operation, the cutters become dull or broken so that it is necessary to replace the cutters in operation. This has heretofore required the pulling of the string so that the entire cutter could be replaced.

In the present cutter, a plurality of cutters is provided in a single tool and means are provided for successively energizing groups of cutters. In this construction, when one of the cutters becomes broken or dull, the tool is retracted until the next set of cutters is in position, after which they will be extended and the cut continued so that any desired space may be cut out of the casing without the necessity of withdrawing the tool from the casing.

In the present invention, this is accomplished by providing groups of cutters in longitudinally spaced relation along a tool body and having a piston slidable in the body for successively engaging groups of cutters for bringing them from retracted to operative position.

It is accordingly an object of the invention to provide an improved casing cutting tool.

It is a further object of the invention to provide a cutting tool having a plurality of cutters which may be successively projected into cutting position.

It is a further object of the invention to provide a cutting tool having a cutter positioning member which may be controlled from the surface of the ground.

It is a further object of the invention to provide a fluid controlled cutting tool.

Other objects and many of the attendant advantages of the present invention will be apparent from the following detailed description taken in conjunction with the accompanying drawing in which:

Figure 1 is a sectional elevation of the casing milling tool in place in a casing;

Figure 2 is a cross-section of the milling tool taken substantially on the section line 2—2 of Figure 1;

Figure 3 is a fragmentary sectional elevation of the cutting tool showing the cutter in extended position;

Figure 4 is a view of the cutter in retracted position;

Figure 5 is a perspective view of the milling cutter for mounting in the tool;

Figure 10 is a sectional elevation showing a further modification according to the invention;

Figure 11 is a cross-section taken substantially on the plane indicated by the section line 11—11 of Figure 10;

Figure 12 is a view similar to Figures 3 and 8, showing the cutter of this modification in extended relation;

Figure 13 is a view similar to Figures 4 and 9, showing the cutter in retracted position; and Figure 14 is a sectional elevation substantially similar to Figures 1, 6 and 10 and showing still a further modification according to the invention.

Figure 6:
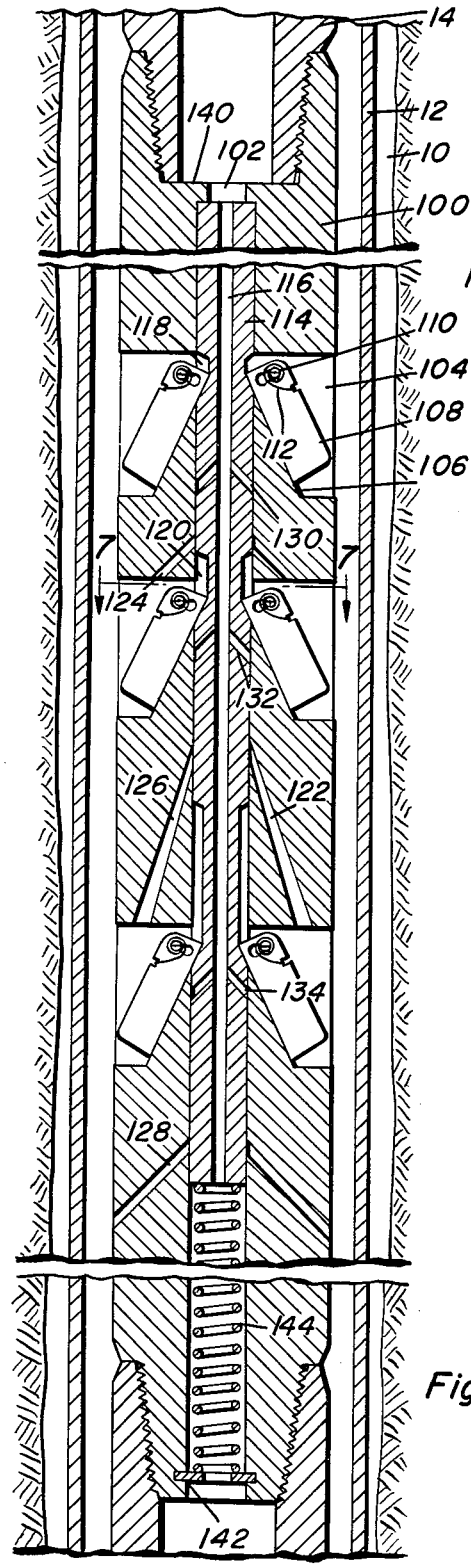
Figure 6 is a sectional elevation showing a modification according to the invention.

In the exemplary embodiment of the invention according to Figures 1 to 5, the well hole 10 is provided with a casing 12 which is to be cut away to provide a window for providing any angular extension of the hole 10. The drill tubing 14 extends into the well and is provided at the lower end with the usual pin 16.

The cutting tool proper comprises a body constructed as an elongated member 18 having a central bore 20 therein. Preferably, the body 18 is constructed of a plurality of sections, such as 22, 24 and 25, and obviously, as many sections as may be desired may be provided.

Tool slots 30 are milled in the outer face of the tool body 18 and extend from the outer face and communicate with the bore 20. Preferably, a plurality of the slots 30 are provided in longitudinal spaced relation on the body 18 and as many groups of tools may be provided as is desired, and obviously, as many tools may be placed in either group as may be desired.

The bottom slope of the slots 30 is each provided with inclined surfaces so that the bottom edge 32 of a knife 34 may be supported on the bottom edge 36 of the slot 30.

The cutting element 34 is provided with a bottom cutting edge and a longitudinally extending pivot slot 42 which is preferably enlarged at the ends to provide a restricted center portion 44. The upper outer corner 46 of the cutting tool is cut away so that it may readily rotate about an axis through the slot 42. The lower inner corner is provided with substantially a right angular edge 48 for a purpose presently to be described.

Each of the slots 30 is provided with a transverse pivot pin 50 which engages in the slot 42 and a spring 52 is engaged between the pin 50 and the cutter 34, preferably by engaging in a suitable slot 54 in the cutter 34 so that the pin 50 will be retained at the outer end of the slot 42. In this position, the inner corner 48 of the cutter 34 extends into the bore 20. An operating device for each group of cutters 34 comprises a piston 60 having a central mud passage 62. It will be obvious that there will be as many pistons 60 as there are groups of cutters to be operated. A stop member 64 is placed in the passage 20 below each of the pistons 60, and each of the pistons 60 is maintained by means of a suitable bias spring 66 which biases the piston to an upper and inactive position. When a plurality of pistons 60 are utilized, a plurality of section springs 66 will be utilized with the springs being successively stronger from the top downward. Each piston 60 is provided with suitable recesses 68 providing cutter engaging shoulders 70. A stop 72 prevents the excessive upward movement of the piston 60 while the stop 64 retains the piston spring from excessive downward movement. By virtue of the springs 66 the plural pistons form in effect a sectional piston assembly.

The body 18 is provided with a plurality of laterally extending mud passages 74 arranged adjacent the bottoms of the slots 30 and provide lateral passages for the escape of the mud from the body 18.

In the operation of this form of the invention, the springs 66 will retain the piston segments 60 in upward raised position, and the springs 52 will retain the inner top corner of the cutter into operating engagement in the bore 20. When the tool has been run into the casing 12 by means of the string 14 to the desired location, fluid pressure will be applied in the passage 20 which will cause each piston 60 to compress the spring 66 to rotate each cutter 34 until the edge thereof comes into contact with the casing 12. Rotation of the drill tubing 14 will then cause the cutter to cut a hole in the casing 12 and the pressure on the piston 60 will continue to apply the pressure until the knife has cut through and extends laterally from the tool, as shown in Figure 3. In this position, the top 76 of the tool holding slot 30 will engage the back of the cutter 34 to rigidly support the same in laterally extending relation. Further rotation of the string 14 will cause the cutters 34 to cut away the top of the casing until the cutters either become dull or broken. At the time that the cutters 34 extended outwardly from the body 18, the cylinder segment 60 would move downward in the bore 20 so that the fluid would escape through the slots 30 past the cutters 34 and the relief in the pressure would prevent further downward movement of the piston 60.

When it becomes desirable to retract the cutter 34 because of breakage or dullness thereof, the string of drill tubing 14 is raised to lift the cutters 34 out of engagement with the casing 12 and extra pressure is supplied to the piston segment 60 which will then pass below the corner 48 so that the unsupported blade 34 will be rotated about the pin 50 by the spring 52. The pressure will then be released in the string 14, and the spring 66 will then retrieve the piston segment 60 to its original position. In moving upward, the piston 60 will engage the lower edge 32 of the blade 34 and cause the blade to move laterally on the slot 42.

To set the second group of cutters 34, the string 14 is then raised so that the second section of cutters is in proper position and sufficient pressure is applied to the inside of the well tubing string 14 to compress the first spring 66 and cause the second section of the piston 60 to operate the cutters in that group. Obviously, as many sections or groups of cutters may be provided as may be necessary to provide the necessary window in the casing 12.

Figure 8:
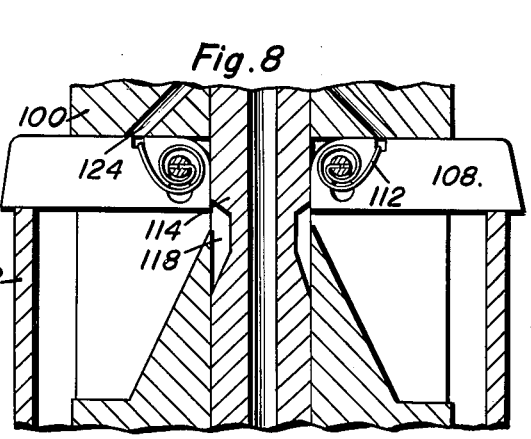
Figure 8 is a fragmentary sectional elevation showing the cutter in extended relation.
Figure 9:
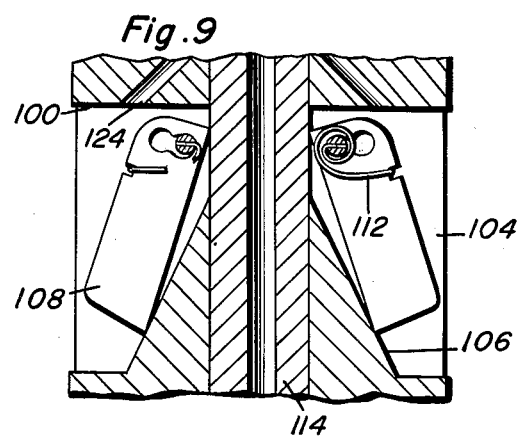
Figure 9 is a similar view showing the cutter in retracted position.
Figure 7:
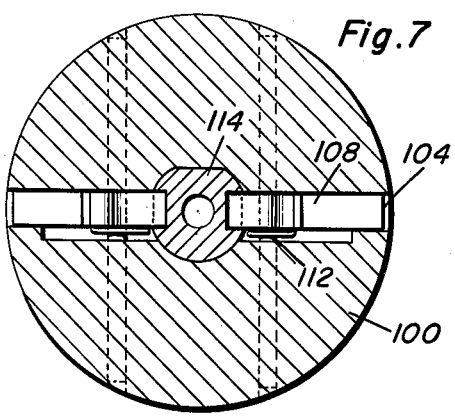
Figure 7 is a cross-section through the modification of Figure 6, taken substantially on the plane indicated by section line 7—7 of Figure 6.

In the construction according to Figures 6 to 9, the tool body 100 is constructed of an elongated body having the central bore 102 and a plurality of tool mounting slots 104 arranged in spaced longitudinal relation along the body 100 and as will be seen, the bottom 106 of the slot 104 will be tapered inwardly, while the top of the slot 104 communicates with the bore 102. Blades 108 are mounted in the slots 104 by means of pins 110 and springs 112 cooperate with the pins 110 and the blades 108 to move them into the bore 102. The piston 114 is provided with a central core 116 for the passage of drilling mud therethrough. The piston 114 extends substantially the full length of the body 100 and is provided with milled out slots 118 for receiving the upper inner corners of the blades 108. The slots 118 for the first group of blades 108 are relatively short so that a relatively short movement of the piston 114 will activate this group of blades. The slots 120 for the second group of blades will be of greater length while the slots 122 for the third group of blades will be of still greater length. Lateral mud passages 124 extend from the central bore 102 below the first group of cutters. A similar passage 126 extends outwardly from the next lower passage. While a final passage 128 will also extend outwardly from the body. The piston 114 is provided with a series of lateral passages, with 130 corresponding to the first group of cutters and 132 corresponding to the second group of cutters, and 134 corresponding to the third group of cutters.

A stop 140 is provided at the top of the bore 102 and a stop 142 is provided at the bottom of the bore 102, while a bias spring 144 rests on the stop 142 and engages the lower end of the piston 114.

In the operation of this form of the invention, the tool body is lowered as before, after which pressure is applied to the piston 114 to cause it to move downward to rotate the cutters 108 until the passages 130 communicate with the passage 124, which will relieve the pressure in the device so that there will be no further downward movement until the pressure is increased. When the first group of cutters has been dulled, the pressure will be released so that the cutters 108 will be moved downwardly and laterally as explained before. Pressure will then be reapplied so that the passage 132 will communicate with the passage 126 at which time the second group of cutters 108 will have been rotated into cutting position.

Obviously, this change-over mechanism may be utilized for any numer of groups of cutters, while only three have been shown. Obviously, any desired number of groups of cutters could be utilized.

In the modification according to Figures 10 to 13, a body 200 is provided with a central passage 202 and having two mounting slots 204 mounted therein with the slots 204 having sloping bottoms 206. Blades 208 are mounted on pins 210 extending transversely of the slots 204 and the blade 208 is biased to have the inner top corner extend into the bore 202 by means of the spring 212. A piston 214 is slidable in the bore 202 and is provided with a longtudinally extending mud passage 216. The lower end of the piston 214 is provided with shoulders 218 for engaging the inner top ends of the blades 208.

The piston 214 is provided with an elongated stem 220 which passes through a bottom guide 222 to which is attached a tension spring 224 for urging the piston 214 against the stop 226. The body 200 is provided with longitudinally extending passages 230 and 232, 234, 236 corresponding to each group of the knives 208, as shown. The piston 214 is provided with a lateral passage 240 for communicating with either of the passages 230—236.

In the operation of this form of the device, after the tool has been lowered by means of the drilling tubing 14, pressure is applied into the device so that the shoulder 218 will move forward and rotate the blades 208 into cutting position. When the blades have moved to horizontal position, the aperture 240 will coincide with the lateral passage 230 so that the escape of fluid therethrough will release the pressure so that the knives of the first group will be held in cutting relation.

When it is desired to retract the first group of blades and extend the second group of blades, sufficient pressure will be applied in the piston 214 to push it past the first group of blades 208 until the shoulder 218 contacts the second group of blades and causes the same to move into horizontal relation, at which time the lateral passage 240 will communicate with the lateral passage 232. When the casing has been cut out to the desired depth, the pressure will be released, and the piston 214 will move upwardly under the impulse of the spring 224 causing the top of the piston to engage the inner top corners of the blades 208 so that they will be pushed laterally on the pins 210 to permit the upward motion of the piston 214.

In the modification according to Figure 14, the body 300 is provided with a central bore 302 in which is suspended a sliding piston 304 and having lateral mounting slots 306 in which are mounted pivoted blades 308. The piston 304 will be suspended by suitable tension spring 310 and will be provided with a central mud passage 312 and a transverse passage 314. The body 300 will be provided with transverse lateral passages 316 and 318. The piston 304 will be provided with shoulders 320 for cooperating with the first group of knives 308 while the end of the piston will be provided with shoulders 322 for cooperation with the second group of knives.

In the operation of this form of the device, the device will be lowered into the well as before, after which the pressure will elongate the spring 310 so that the shoulders 320 will operate the first group of knives 308 until the lateral passage 314 comes in registry with the lateral passage 316. When it is desired to project the second group of cutters 308, the piston 304 is retrieved to push the first group of cutters 308 laterally in their groove, at which time further pressure will cause the piston to move down until the passage 314 is in communication with the passage 316, at which time the shoulder 322 will cause the projection of the second group of knives 308.

For purposes of exemplification, particular embodiments of the invention have been shown and described according to the best present understanding thereof. However, it will be apparent to those skilled in the art that various changes and modifications may be made in the construction and arrangement of the parts thereof without departing from the true spirit and scope of the invention.

What is claimed as new is as follows:

1. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs carried by the pins and engaging said cutters, each spring urging a portion of each of said cutters into the bore of said tubular body, piston means slidable in the bore of said body, shoulders on said piston means, said piston means being operable to successively engage said shoulders with the portion of the cutters extending into the bore to rotate said cutters about said pins.

2. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs carried by the pins and engaging said cutters, each spring urging a portion of each of said cutters into the bore of said tubular body, piston means slidable in the bore of said body, shoulders on said piston means, said piston means being operable to successively engage said shoulders with the portion of the cutters extending into the bore to rotate said cutters about said pins, a longitudinal mud passage through said piston means.

3. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs carried by the pins and engaging said cutters, each spring urging a portion of each of said cutters into the bore of said tubular body, piston means slidable in the bore of said body, shoulders on said piston means, said piston means being operable to engage said shoulders with the portion of the cutters extending into the bore to rotate said cutters about said pins, a longitudinal mud passage through said piston means, lateral mud passages longitudinally spaced in said body, for communication with said longitudinal mud passage, said shoulders on said piston means successively engaging said longitudinal spaced cutters.

4. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs carried by the pins and engaging said cutters, each spring urging a portion of each of said cutters into the bore of said tubular body, piston means slidable in the bore of said body, shoulders on said piston means, said piston means being operable to engage said shoulders with the portion of the cutters extending into the bore to rotate said cutters about said pins, a longitudinal mud passage through said piston means, lateral mud passages longitudinally spaced in said body for communication with said longitudinal mud passage, said piston means successively engaging said longitudinally spaced cutters, a biasing spring biasing said shoulders on said piston out of engagement with said cutters.

5. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs engaging each of said cutters, said spring urging a portion of each of said cutters into the bore of said tubular body, piston means slidable in the bore of said body, shoulders on said piston means, said piston means being operable to successively engage said shoulders with the portion of the cutters extending into the bore to rotate said cutters about said pins, a longitudinal mud passage through said piston means, lateral mud passages longitudinally spaced in said body for communication with said longitudinal mud passage, resilient means biasing said shoulders on said piston means out of engagement with said cutters, said piston means constituting a plurality of pistons, said resilient means being interposed between adjacent said pistons.

6. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs engaging each of said cutters, said spring urging a portion of each of said cutters into the bore of said tubular body, piston means slidable in the bore of said body, shoulders on said piston means, said piston means being operable to successively engage said shoulders with the portion of the cutters extending into the bore to rotate said cutters about said pins, a longitudinal mud passage through said piston means, lateral mud passages longitudinally spaced in said body for communication with said longitudinal mud passage, resilient means biasing said shoulders on said piston means out of engagement with said cutters, said piston means constituting a plurality of pistons, said resilient means being interposed between adjacent said pistons, the segments of said spring being successively of greater strength, whereby said segments of said piston means successively engage said cutters.

7. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs engaging each of said cutters, said spring urging a portion of each of said cutters into the bore of said tubular body, piston means slidable in the bore of said body, shoulders on said piston means, said piston means being operable to successively engage said shoulders with the portion of the cutters extending into the bore to rotate said cutters about said pins, a longitudinal mud passage through said piston means, lateral mud passages longitudinally spaced in said body for communication with said longitudinal mud passage, resilient means biasing said shoulders on said piston means out of engagement with said cutters, said slots being tapered whereby said cutters are retained at an inclined position when out of engagement with said shoulders.

8. A casing milling tool comprising a tubular body, said body having a plurality of longitudinally spaced tool mounting slots therein, said mounting slots communicating with the bore of said tubular body, a pivot pin extending transversely across each of said mounting slots, milling cutters having elongated pivot apertures adjacent one end thereof, said pins extending through said apertures, springs engaging each of said cutters, said spring urging a portion of each of said cutters into the bore of said tubular body, pistons means slidable in the bore of said body, shoulders on said piston means, said piston means being operable to successively engage said shoulders with the portion of the cutters extending into the bore to rotate said cutters about said pins, a longitudinal mud passage through said piston means, lateral mud passages longitudinally spaced in said body for communication with said longitudinal mud passage, resilient means biasing said shoulders on said piston means out of engagement with said cutters, said slots being contoured to provide a rigid abutment surface for said cutters in extended position.

9. A casing milling tool comprising an elongated cutter supporting body having an axial bore therein, a plurality of longitudinally spaced cutter mounting slots in the outer lateral face of said body, said slots communicating with said bore, a transverse pivot pin extending across each of said slots, cutting blades each having a transverse, elongated pin receiving pivot slot at one end thereof, each of said pins mounting a blade through the pivot slot thereof, a holding spring engaged between each of said pins and the cutter pivoted thereon, said holding spring urging a portion of said cutter into said bore, a piston slidable in said bore, shoulders on said piston successively engageable with the portion of the cutters extending into said bore to project the cutters outwardly from the body as the piston is moved in one direction and to traverse the cutter on the pin to move the projecting portion from the bore without projecting the cutters outwardly from the body as the piston is moved in the opposite direction.

References Cited in the file of this patent

UNITED STATES PATENTS

| | | |
|---|---|---|
| Re. 21,824 | Lowrey | June 10, 1941 |
| 2,246,711 | Barrett et al. | June 24, 1941 |
| 2,353,284 | Barrett | July 11, 1944 |
| 2,389,235 | Harrison | Nov. 20, 1945 |